United States Patent [19]

Lia

[11] Patent Number: 4,870,513
[45] Date of Patent: Sep. 26, 1989

[54] METHOD AND ARRANGEMENT FOR THE RECORDING AND PLAYBACK OF DATA

[75] Inventor: Hermann Lia, Li, Norway

[73] Assignee: Tandberg Data A/S, Oslo, Norway

[21] Appl. No.: 908,568

[22] Filed: Sep. 18, 1986

[30] Foreign Application Priority Data

Sep. 19, 1985 [DE] Fed. Rep. of Germany ....... 3533454

[51] Int. Cl.$^4$ .............................................. G11B 5/09
[52] U.S. Cl. ......................................... 360/45; 360/46
[58] Field of Search ............................ 360/45, 46, 68

[56] References Cited

U.S. PATENT DOCUMENTS 3,067,422 12/1962 Hunt ...................................... 360/45
4,633,336 12/1986 Horie et al. ............................ 360/45

Primary Examiner—Vincent P. Canney
Attorney, Agent, or Firm—Hill, Van Santen, Steadman & Simpson

[57] ABSTRACT

For the purpose of increasing storage density of data recorded on a magnetic recording medium, particularly on a magnetic tape, a coder stage is supplied with data signals allocated to the record data and with high-frequency magnetization signals. The coder stage generates write signals which are recorded with the magnetization signals. The pulse duration or the pulse pause of the respectively existing magnetization signal is lengthened given every change of the data signals. The magnetization signals and the data signals are preferably synchronized with one another such that the polarity of the magnetization of the recording medium changes at every change of the data signals. In the playback of the data, the peak values of the magnetization have zero axis crossings of the read output signals allocated to them. At the zero axis crossings, a detector stage generates data signals for a decoding of the recorded data.

13 Claims, 3 Drawing Sheets

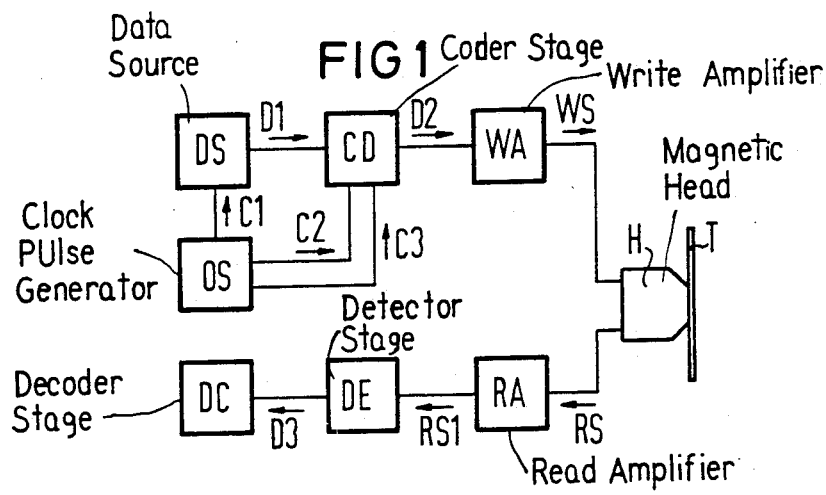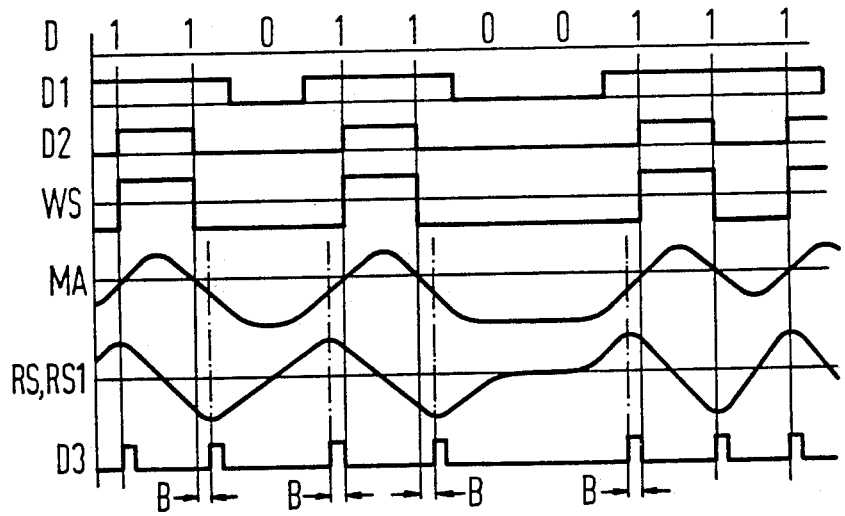

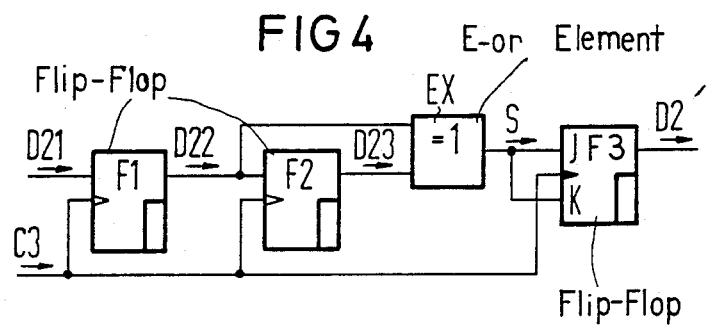
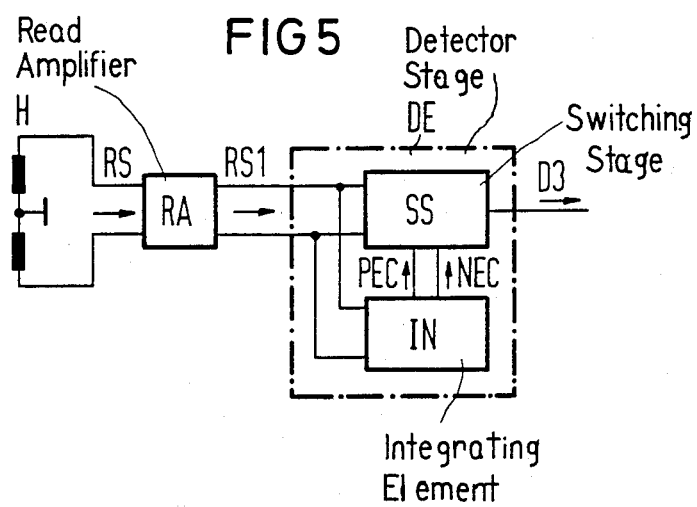

METHOD AND ARRANGEMENT FOR THE RECORDING AND PLAYBACK OF DATA

BACKGROUND OF THE INVENTION

The invention relates to a method for recording data on a magnetic recording medium wherein data signals output by a data source are coded in a coder stage and the coded data signals are supplied to a write amplifier which emits write signals to a data head for recording the data on the data recording medium. The invention also relates to an arrangement for the implementation of the method.

In recording data on a magnetic recording medium, for example a magnetic tape or a magnetic disk, it is already generally known to supply data signals allocated to the record data to a coder stage which generates coded data signals, and to supply these to a write amplifier. The write amplifier generates write-in signals which are usually fashioned as write currents which are proportional to the coded data signals. Numerous writing methods, for example the NRZI, the MFM, or the GCR writing method are available for coding the data signals.

When the write currents are supplied directly to a write head in the magnetic head, the magnetization of the recording medium corresponds to the chronological curve of the write currents. This method is generally referred to as a direct recording method. The implementation of this method is extremely simple, but it exhibits various disadvantages. When no premagnetization is employed and the write signal is the only excitation of the recording medium, the recording process is nonlinear and the recording sensitivity is low. A relatively high write current is required in order to magnetize the recording medium up to its saturation, and this results in the fact that modulation signals and cross-talk occur to a high degree.

When the recording density is increased, the signal-to-noise ratio is also deteriorated and a shift of the rated point in time of the peaks of the read signals occurs, this being generally referred to as "bit shift". The principal reason for the peak shift lies in the a-symmetry of the magnetization of the recording medium, which depends on the appearance of the binary characters 0 and 1 in the data signals. This results from the fact that the recording medium is magnetized up to its saturation in both directions, and the remanence on the recording medium is a function of the spacing between two successive magnetization changes. The magnetization of the recording medium between two magnetization changes is redundant as viewed from the standpoint of data storage, and represents a principal reason for the peak shift.

The read output signals have a maximum at that location at which the magnetic flux exhibits its greatest positive slope, and have a minimum at that location at which the magnetic flux exhibits its greatest negative slope. These points are employed in order to recover the data, and it is standard to differentiate the read output signals and to teen identify the successive zero axis crossings. Consequently, these locations have the same degree of peak displacement as is present in the magnetization of the recording medium. Every differentiation of the magnetic flux is connected with an increase of noise, which means that the signal-to-noise ratio is lower than is maximally prescribed by the magnetization.

German OS No. 32 33 489, corresponding to U.S. Pat. No. 4,547,818, incorporated herein by reference, discloses that the write signals can be superimposed with high-frequency premagnetization signals and can be supplied to the magnetic head. The recording medium is alternately magnetized up to its saturation by the pre-magnetization signals having a frequency which lies far above the pass band of the read channel.

As a result of employing pre-magnetization signals, the recording process is linearized and a more precise recording thus occurs. The recording sensitivity becomes greater, which means that a corresponding magnetization can be achieved with a significantly lower write current. The advantage is that fewer modulation signals and less cross talk appear in the read channel.

SUMMARY OF THE INVENTION

An object of the invention is to specify a further method for the recording and reproduction of data such that the data can be recorded with a high recording density, and wherein a low shift of the rated points in time of the peaks of the read output signals will occur.

In accordance with the invention, the write signals for writing with the data head are formed from magnetization signals whose period duration is significantly smaller than a shortest spacing between two successive changes of binary values of the coded data signals. A duration of the respective magnetization signals is lengthened given every change of the binary values of the coded data signals. During the playback, the recorded data is recovered from zero axis crossings of the read output signals.

In the method of the invention, magnetization signals, i.e. their pulse durations or pulse pauses, are respectively lengthened when the coded data signals change their binary values. The magnetization signals remain unaltered when the binary values of the coded data signals do not change. Differing from the known methods, the magnetization of the recording medium itself, and not the change thereof, represents the coded data signals.

The lengthening of the magnetization signals at the points in time of the changes of the binary values of the coded data signals preferably occurs such that successive, lengthened magnetization signals have opposite polarities.

It proves advantageous when the magnetization signals are synchronized with the data signals, and/or when the respective magnetization signals are lengthened to a duration which corresponds to n-times the period duration of the magnetization signal, whereby n is a whole number.

In case the data signals are coded such as known from the NRZI or GCR methods wherein the binary value of the data signals changes given a respective, first binary character and the binary value remains unaltered given the second binary character, it is preferable when the duration of the respectively existing magnetization signals is lengthened given every recording of the first binary value, and the magnetization signal remains unaltered given every recording of the second binary value.

The magnetization signals are preferably high-frequency magnetization signals whose frequency lies above the pass band of the read channel, and which correspond to the known premagnetization signals.

For playback of the data recorded on the recording medium, the read output signals have zero axis crossings at the locations allocated to the extreme values of the magnetization. In order to be able to distinguish these zero axis crossings from the zero axis crossings between two magnetizations, it is advantageous to integrate the read output signals, and to only evaluate them when the integrated read output signals exceed prescribed threshold voltages.

An advantageous arrangement for the implementation of the method contains a coder stage which is provided with a converter which generates the write signals from the coded data signals and from the periodic magnetization signals generated in an oscillator, these write signals being respectively lengthened when a change of the coded data signals exists.

In a preferred embodiment, the converter contains a delay element which delays the coded data signals by at least one half a period duration of the magnetization signals and which generates a control signal given an inequality of the data signals. It also contains a flip-flop which, with every change of the magnetization signals, is flipped in one direction when it is not inhibited in its respectively flipped position due to the control signal.

The delay element is preferably fashioned as a shift register at whose data inputs the coded data signals are adjacent and at whose clock inputs the clock pulses allocated to the magnetization signals are adjacent.

It is favorable for the playback of the data when an integrating element is provided, the read output signals being supplied thereto and said integrating element always emitting evaluation signals when the corresponding integrated read output signals exceed prescribed threshold voltages. It is also favorable when a zero-axis crossing detector is provided which emits zero axis crossing signals allocated to zero axis crossings whenever the evaluation signals are present.

BRIEF DESCRIPTION OF THE DRAWINGS

FIG. 1 is a block circuit diagram of an arrangement for the recording and playback of data;

FIG. 2 illustrates time diagrams of signals at various points of a known arrangement;

FIG. 4 is an exemplary embodiment of a converter in a coder stage; and

FIG. 5 is a block circuit diagram of a detector stage.

DESCRIPTION OF THE PREFERRED EMBODIMENTS

Figure 3:
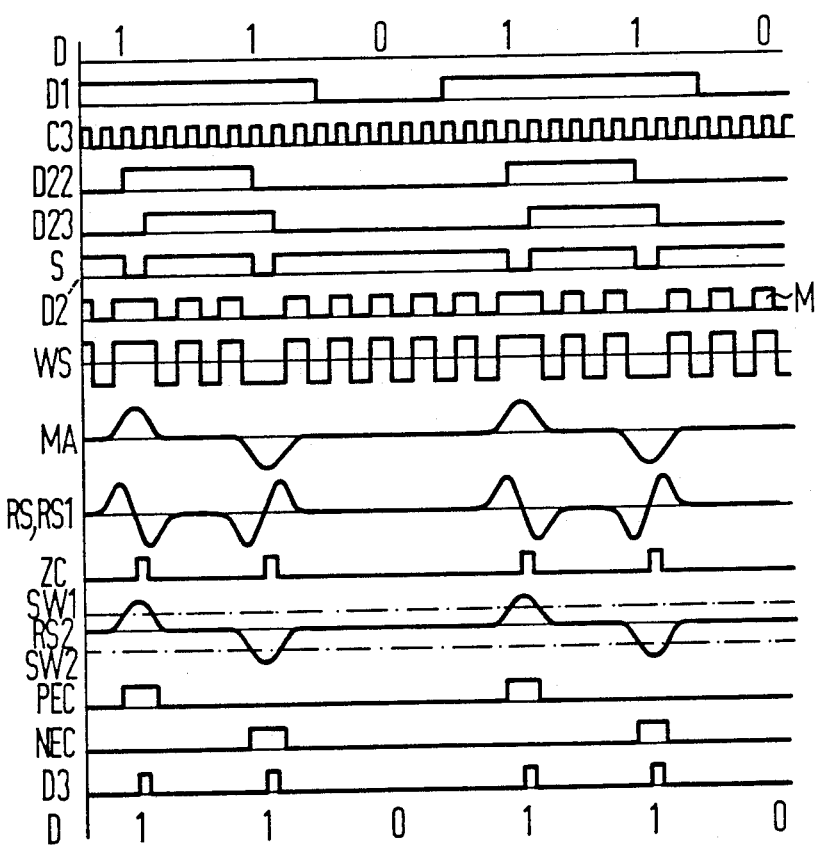
FIG. 3 shows time diagrams given signals appearing based on the method of the invention.

In the arrangement shown in FIG. 1, a data source DS emits the binary data D to be recorded on a magnetic recording medium T by means of a magnetic head H. The data D are represented by the data signal D1, whereby these respectively assume a first binary value 1 or a second binary value 0 when the binary characters 1 or 0 are to be recorded as data D.

FIG. 2 shows the data signals D1 belonging to a prescribed sequence of data D. The coder stage CD allocates coded data signals D2 to the data signals D1, these coded data signals D2 being coded in accordance with an employed recording method, for example the NRZI or GCR method. In this case, the data signals D2 shown in FIG. 2 always exhibit a change of their binary values, for example when binary characters 1 are recorded. The changes of the data signals D1 and D2 occur at respective prescribed points in time defined by clock pulses C1 or C2. The data signals D2 are present at a write amplifier WA which generates the write signals WS in the form of write currents which are proportional to the data signals D2. The write signals WS are supplied to the write head of a magnetic head H and effect a magnetization on the recording medium T, this magnetization being shown as magnetization MA in FIG. 2.

When reading the recording medium T by means of a read head provided in the magnetic head H, read output signals RS are generated which have their extreme values at the locations of the greatest change of the magnetization MA. These read output signals RS are amplified by means of a read amplifier RA and are supplied to a detector stage DE as read output signals RS1. At the locations of the extreme values of the read output signals RS1, this detector stage DE respectively generates data pulses D3 from which the recorded data are recovered in a decoder stage DC in a way known per se.

As may be derived from FIG. 2, the points in time of the data pulses D3 differ from the corresponding changes of the binary values of the data signals D2. This results because the magnetization MA is not symmetrical relative to the zero line, and thus the points of greatest possible slope of the magnetization MA and thus the extreme values of the read output signals RS or RS1 are shifted. This shift from the rated points in time is referred to as peak shift or bit shift B.

Given the time diagrams shown in FIG. 3, the data signals D2 are not generated in accordance with a known recording method, but by use of a converter in a coder stage CD which is shown in FIG. 4, and the data signals D3 are generated by use of a detector stage DE shown in FIG. 5.

The converter shown in FIG. 4 contains a shift register formed of two flip-flops F1 and F2. The data inputs of the shift register are supplied with first coded data signals D21 which, for example, correspond to the coded data signals D2 in FIG. 2 in case the coder stage CD codes the data signals D1 in accordance with the NRZI or GCR methods. The clock inputs of the shift register are supplied with clock pulses C3 which preferably represent high-frequency rectangular signals, and which are synchronized with the clock pulses C1. The output signals D22 or D23 at the flip-flops F1 or F2 of the shift register are supplied to an exclusive-OR element EX which emits a control signal S having the binary value 0, given inequality of the output signals D22 and D23. The shift register delays the output signals D22 and D23 by the period duration of the clock pulses T3 and represents a delay element with the assistance of which changes of the data signals D21 can be identified.

The control signals S are present at the J inputs and K inputs of a flip-flop F3 which is always flipped by the clock signals C3 when the control signal S exhibits the binary value 1. When, however, the control signal S exhibits the binary value 0, the flip-flop F3 is inhibited until the control signal S again assumes the binary value 1. The second coded data signals D2' thus exhibit a curve as shown in FIG. 3. They exhibit periodic magnetization signals M which do not change between two changes of the data signals D22, and the duration of which is lengthened at every change of the data signals D22. The lengthening preferably occurs such that the polarity of the data signals D21 changes at every lengthening. As long as they are lengthened, the magnetization signals M in the second coded data signals D2' correspond, for example, to known pre-magnetization signals given a recording of data by use of high-frequency pre-magnetization signals.

When the repetition frequency of the magnetization signals M is selected such that it lies outside of the pass band of the write-read channel, the recording medium T is only magnetized at the locations at which the magnetization signals M are lengthened and which, given the illustrated exemplary embodiment, are allocated to the binary character 1. As the curve of the magnetization MA in FIG. 3 shows, this occurs only at the binary characters 1 and respectively exhibits the value 0 between them.

When reading the recording data, double pulses which respectively have a zero axis crossing at the extreme values of the magnetization MA arise as read output signals RS.

The detector stage DE as shown in FIG. 5 generates zero axis crossing pulses ZC at the zero axis crossings of the read output signals RS or of the amplified read output signals RS1. The detector stage DE comprises an integrating element IN which integrates the read output signals RS1 in order to obtain the read output signals RS2. The integrating element IN also contains a threshold stage which compares the integrated read output signals RS2 to prescribed threshold voltages SW1 and SW2, and which generates evaluation signals PEC and NEC given upward or downward transgression of these threshold voltages SW1 or SW2. A switching stage SS which generates the zero axis crossing pulses ZC emits these to the decoder stage DC as data pulses D3 only when the integrated read output signals RS2 upwardly or downwardly exceed the corresponding threshold voltages SW1 or SW2, and the evaluation signals PEC and NEC appear. In this way, it is assured that zero axis crossing pulses ZC which appear between the read output signals RS1 as a consequence of disturbances are not interpreted as data signals D3.

For the evaluation of the read output signals RS1, it is also conceivable to employ a circuit arrangement which, instead of comparing the integrated read output signals RS2 to prescribed threshold voltages, compares the read output signals RS1 themselves to prescribed threshold voltages. Such a circuit arrangement is known, for example, from German OS No. 33 23 336.

A lengthening of the magnetization signals M in the coded data signals D2' to the factor 2 corresponds to a phase skip of the magnetization signals M by 180°. It is also possible to execute the lengthening by some other factor. Preferably, however, the magnetization signals M are synchronized with the data signals D1 or first coded data signals D21 in this case as well. It is also preferable to execute the lengthenings of the magnetization signals M such that a differing polarity of the magnetization MA alternately appears.

Although various minor changes and modifications might be proposed by those skilled in the art, it will be understood that I wish to include within the claims of the patent warranted hereon all such changes and modifications as reasonably come within my contribution to the art.

I claim as my invention:

1. A method for recording and playback of data by use of a magnetic data recording medium, comprising the steps of:
    feeding data signals output by a data source to a coder stage where they are coded to form first coded data signals having binary values, and forming second coded data signals formed of magnetization signals and derived from said first coded data signals;
    supplying the second coded data signals to a write amplifier which emits write signals to a data head for recording the data on the data recording medium such that the data is recorded as magnetizations of the recording medium by use of the write signals;
    providing the magnetization signals with a period duration which is significantly smaller than a shortest spacing between two successive changes of the binary values of the first coded data signals;
    for every change of the binary values of the first coded data signals, lengthening a period duration of a corresponding one of the magnetization signals; and
    during playback, generating read output signals from which the data are reacquired based on zero axis crossings of the read output signals.

2. A method according to claim 1 wherein the lengthened magnetization signals alternately have a respective opposite polarity.

3. A method according to claim 1 wherein the magnetization signals are synchronized with the first coded data signals.

4. A method according to claim 1 wherein at every change of the binary values of the first coded data signals, the period duration of said respective one of the magnetization signals is n-times the period duration of the magnetization signals occurring between binary data changes, and wherein n is a whole number.

5. A method according to claim 1 wherein the first coded data signals respectively change their binary value whenever a first binary character is recorded and retain a respective binary value whenever a secondary binary character is recorded; the period duration of the corresponding one of the magnetization signals being lengthened at every recording of said first binary character; and the period duration of the magnetization signals remaining unaltered at every recording of said second binary character.

6. A method according to claim 1 including the step of providing the magnetization signals as high-frequency pre-magnetization signals in said second coded data signals.

7. A method according to claim 1 including the steps of integrating the read output signals during playback; and only interpreting the zero axis crossings of the read output signals when the integrated read output signals upwardly or downwardly cross prescribed threshold voltages.

8. A system for recording and playback of data by use of a magnetic data recording medium, comprising:
    coder stage means for receiving data signals output by a data source and producing first coded data signals having binary values, and forming second coded data signals formed of magnetization signals and derived from said first coded data signals;
    a write amplifier means connected to receive the second coded data signals and for emitting write signals to a data head means for recording the data on the data recording medium such that the data is recorded as magnetizations of the recording medium by use of the write signals;
    said coder stage means including means for providing the magnetization signals with a period duration which is significantly smaller than a shortest spacing between two successive changes of the binary values of the first coded data signals, and wherein for every change of the binary values of the first coded data signals, a period duration of a corresponding one of the magnetization signals is lengthened; and means for generating read output signals from which the data are reacquired based on the zero axis crossings of the read output signals.

9. A system according to claim 8 wherein a clock pulse generator means is provided for producing clock pulses allocated to the magnetization signals; the coder stage means including converter means for receiving the first coded data signals and clock pulses and which generates the second coded data signals allocated to the magnetization signals, a duration of the magnetization signals being lengthened at every change of the binary values of the first coded data signals.

10. A circuit arrangement according to claim 9 wherein the converter means contains a delay means for delaying the first coded data signals by at least half a period duration of the magnetization signals; means for generating a control signal given an inequality of the first coded data signals and the delayed first coded data signals; and a flip-flop means for flipping with every change of the magnetization signals when it is not inhibited by said control signal.

11. A system according to claim 10 wherein said delay means comprises a shift register, the first coded data signals being connected to its data inputs and said clock pulses allocated to the magnetization signals being connected to its clock inputs.

12. A system according to claim 8 wherein the read output signals are supplied to an integrating means for controlling a switching means such that the switching means emits zero axis crossing pulses allocated to the zero axis crossings of the read output signals only when corresponding integrated read output signals from the integrating means upwardly or downwardly cross given threshold voltages.

13. A system for recording and playback of data by use of a magnetic data recording medium, comprising:

coder stage means for receiving data signals having first and second binary values output by a data source, and for producing coded data signals;

a write amplifier means connected to receive the coded data signals and for emitting write signals to a data head means for recording the data as magnetizations on the data recording medium;

said coder stage means including means for forming said coded data signals as magnetization signals which have a period duration which is smaller than a shortest spacing between two successive changes of the binary values of the data signals, and wherein for every change of the first binary value of the data signals, a period duration of a corresponding one of the magnetization signals is lengthened; and means for generating read output signals based on the recording medium magnetizations and from which the data are reacquired.

* * * * *